(12) United States Patent
Tu et al.

(10) Patent No.: US 9,039,197 B2
(45) Date of Patent: May 26, 2015

(54) PROJECTING APPARATUS HAVING LIGHT SOURCE AXIS AND LIGHT VALVE SURFACE PARALLEL TO THE SAME PLANE

(75) Inventors: Huai-Ming Tu, Taoyuan-Hsien (TW); Sheng-Wei Lin, Taoyuan-Hsien (TW)

(73) Assignee: DELTA ELECTRONICS, INC. (TW)

( * ) Notice: Subject to any disclaimer, the term of this patent is extended or adjusted under 35 U.S.C. 154(b) by 152 days.

(21) Appl. No.: 13/372,845

(22) Filed: Feb. 14, 2012

(65) Prior Publication Data

US 2013/0128239 A1    May 23, 2013

(30) Foreign Application Priority Data

Nov. 22, 2011 (TW) .............................. 100142630 A

(51) Int. Cl.
G03B 21/20 (2006.01)

(52) U.S. Cl.
CPC .......... *G03B 21/2066* (2013.01); *G03B 21/208* (2013.01)

(58) Field of Classification Search
CPC .. G03B 21/2066; G03B 21/208; G03B 21/28; G03B 21/20; G02B 5/04
USPC ............... 353/31, 33, 37, 50, 77, 81, 98, 119; 348/744, 759, 766, 769–771
See application file for complete search history.

(56) References Cited

U.S. PATENT DOCUMENTS

| | | | |
|---|---|---|---|
| 6,390,628 B1 * | 5/2002 | Fujimori et al. ............... | 353/119 |
| 6,655,820 B2 * | 12/2003 | Jung et al. ..................... | 362/318 |
| 6,726,332 B2 * | 4/2004 | Cannon et al. ................. | 353/33 |
| 6,765,544 B1 | 7/2004 | Wilson | |
| 6,840,631 B2 * | 1/2005 | Sawamura et al. ............. | 353/81 |
| 6,840,632 B2 * | 1/2005 | Shyu et al. ..................... | 353/81 |
| 6,926,413 B2 * | 8/2005 | Akiyama ....................... | 353/122 |
| 6,953,275 B2 | 10/2005 | Ferri et al. | |
| 7,360,902 B2 * | 4/2008 | Penn et al. ..................... | 353/30 |
| 7,532,176 B2 * | 5/2009 | Imade ............................. | 345/32 |
| 7,605,978 B2 | 10/2009 | Endo et al. | |
| 7,850,315 B2 * | 12/2010 | Lin et al. ........................ | 353/99 |
| 2007/0064230 A1 | 3/2007 | Harper et al. | |
| 2008/0129964 A1 | 6/2008 | Alasaarela | |
| 2009/0244489 A1 | 10/2009 | Yeh et al. | |
| 2010/0033685 A1 * | 2/2010 | Seo et al. ....................... | 353/31 |
| 2012/0140184 A1 * | 6/2012 | Bruzzone ....................... | 353/20 |

FOREIGN PATENT DOCUMENTS

| | | |
|---|---|---|
| CN | 101101432 A | 1/2008 |
| JP | 2007-323013 A | 12/2007 |

* cited by examiner

*Primary Examiner* — Jori S Reilly-Diakun
(74) *Attorney, Agent, or Firm* — Cantor Colburn LLP

(57) ABSTRACT

A projecting apparatus is disposed within a space defined with first, second and third imaginary planes perpendicular to one another and includes a light source, a prism, a reflecting mirror, and a reflective light valve. The light source emits a light beam propagating along a first optical path parallel with the first and second imaginary planes. The prism is disposed in the first optical path, and refracts the light beam to propagate along a second optical path. The reflecting mirror is disposed in the second optical path, and reflects the light beam to propagate along a third optical path. The reflective light valve is disposed in the third optical path, and has an active plane parallel with the second imaginary plane. Therefore, the light source can be placed horizontally with respect to the reflective light valve to reduce the space occupied by the light source.

10 Claims, 5 Drawing Sheets

PROJECTING APPARATUS HAVING LIGHT SOURCE AXIS AND LIGHT VALVE SURFACE PARALLEL TO THE SAME PLANE

This application claims priority benefit of Taiwan Patent Application No. 100142630 filed on Nov. 22, 2011, which is hereby incorporated herein by reference in its entirety

CROSS-REFERENCES TO RELATED APPLICATIONS

Not applicable.

BACKGROUND OF THE INVENTION

1. Field of the Invention

The present invention provides a projecting apparatus, and more particularly, to a projecting apparatus with a reflective light valve.

2. Descriptions of the Related Art

FIG. 1 illustrates a schematic view of a conventional projecting apparatus. The projecting apparatus may comprise a light source 11, a reflecting mirror 12 and a reflective light valve 13. The light source 11 can emit a light beam 111 to the reflecting mirror 12, while the reflecting mirror 12 can reflect the light beam 111 to the reflective light valve 13. The reflective light valve 13 can also reflect the light beam 111, and control the reflection angle of the light beam 111 so that a portion of the light beam 111 is projected outside the projecting apparatus while the remaining portion of the light beam 111 stays inside the projecting apparatus. The projecting apparatus may further comprise a housing 14 for accommodating the light source 11, the reflecting mirror 12 and the reflective light valve 13 therein.

In conventional projecting apparatuses, the light source 11 must be arranged obliquely with respect to the reflective light valve 13 to project the light beam 111 to the reflecting mirror 12 at a specific angle. Only in this way can the light beam 111 reflected by the reflecting mirror 12 be projected to the reflective light valve 13 at another specific angle, so that the reflective light valve 13 can reflect a portion of the light beam 111 to the outside of the projecting apparatus.

However, arranging the light source 11 obliquely leads to some drawbacks of the projecting apparatus as listed below for example:
1. The light source 11 occupies a large space when being arrange obliquely. Furthermore, in other optical components, such as light uniformizing components, the relay lens that are optically coupled with the light source 11 must also be arranged obliquely, thereby, occupying a large space. Thus, the housing 14 must be made to have a large thickness to provide a sufficient space for accommodating the light source 11 and these optical components. In other words, the oblique arrangement of the light source 11 has impeded the tendency of making the housing 14 thinner.
2. When the light source 11 is arranged obliquely, a side of the light source 11 is disposed very close to the housing 14 to make the space between this side of the light source 11 and the housing 14 insufficient. Consequently, the air flow through this side of the light source 11 will be very limited, which makes it difficult to dissipate heat from this side through air convection.

Accordingly, an urgent need exists in the art to provide a projecting apparatus capable of overcoming at least one of the above drawbacks.

SUMMARY OF THE INVENTION

The primary objective of the present invention is to provide a projecting apparatus whose internal components (e.g., a light source) occupy a small space.

To achieve the aforesaid objective, the present invention discloses a projecting apparatus. The projecting apparatus is disposed within a space defined with a first imaginary plane, a second imaginary plane and a third imaginary plane which are all perpendicular to one another. The projecting apparatus comprises a light source, a prism, a reflecting mirror, and a reflective light valve. The light source emits a light beam propagating along a first optical path, which is substantially parallel with the first and second imaginary planes. The prism is disposed in the first optical path and refracts the light beam to propagate along a second optical path, which intersects the first optical path. The reflecting mirror is disposed in the second optical path and reflects the light beam to propagate along a third optical path, which intersects the second optical path. The reflective light valve is disposed in the third optical path and has an active plane substantially parallel with the second imaginary plane.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
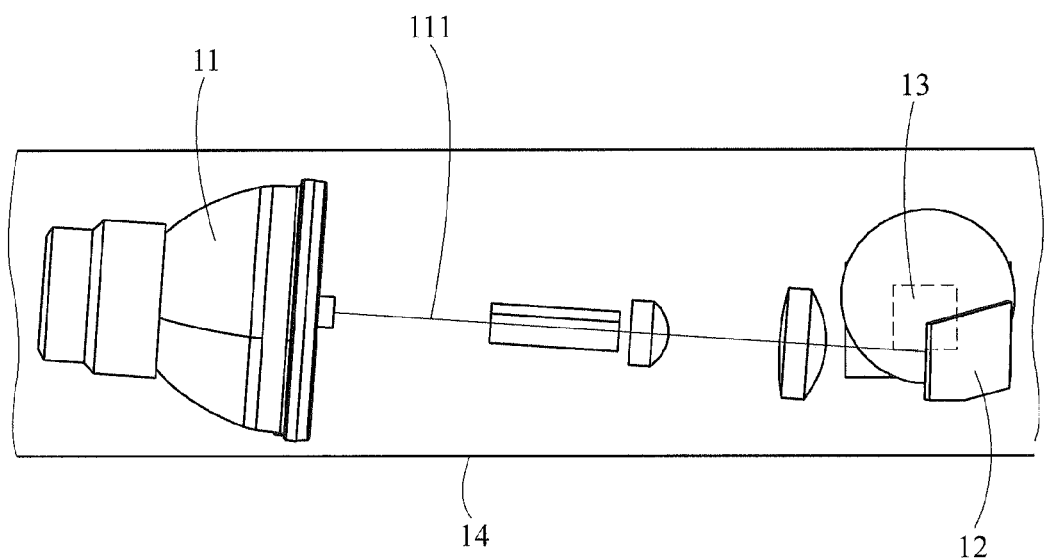
FIG. 1 is a schematic view of a conventional projecting apparatus.
Figure 2:
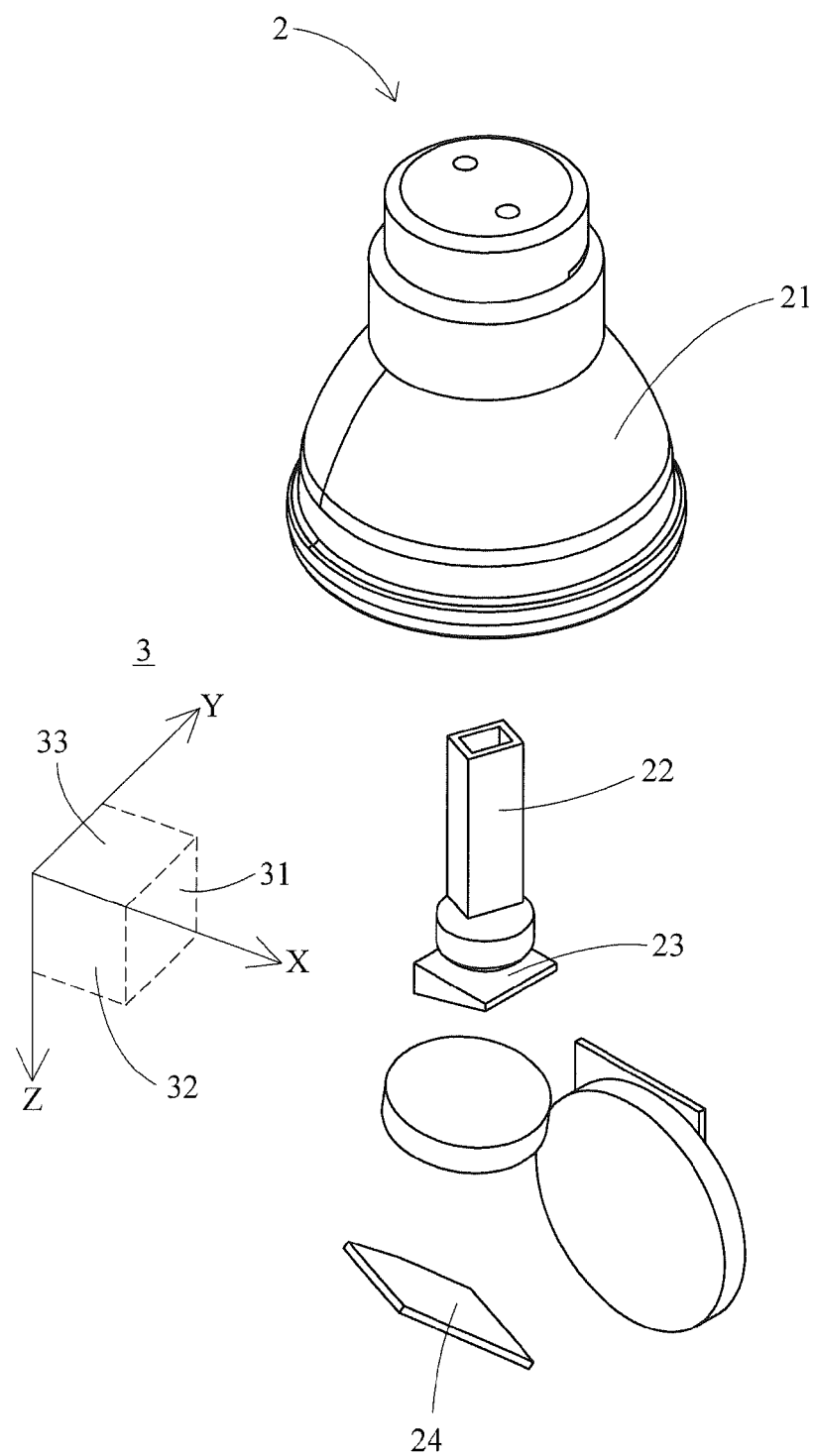
FIG. 2 is a schematic perspective view of the preferred embodiment of a projecting apparatus according to the present invention (with the housing omitted from depiction)
Figure 3:
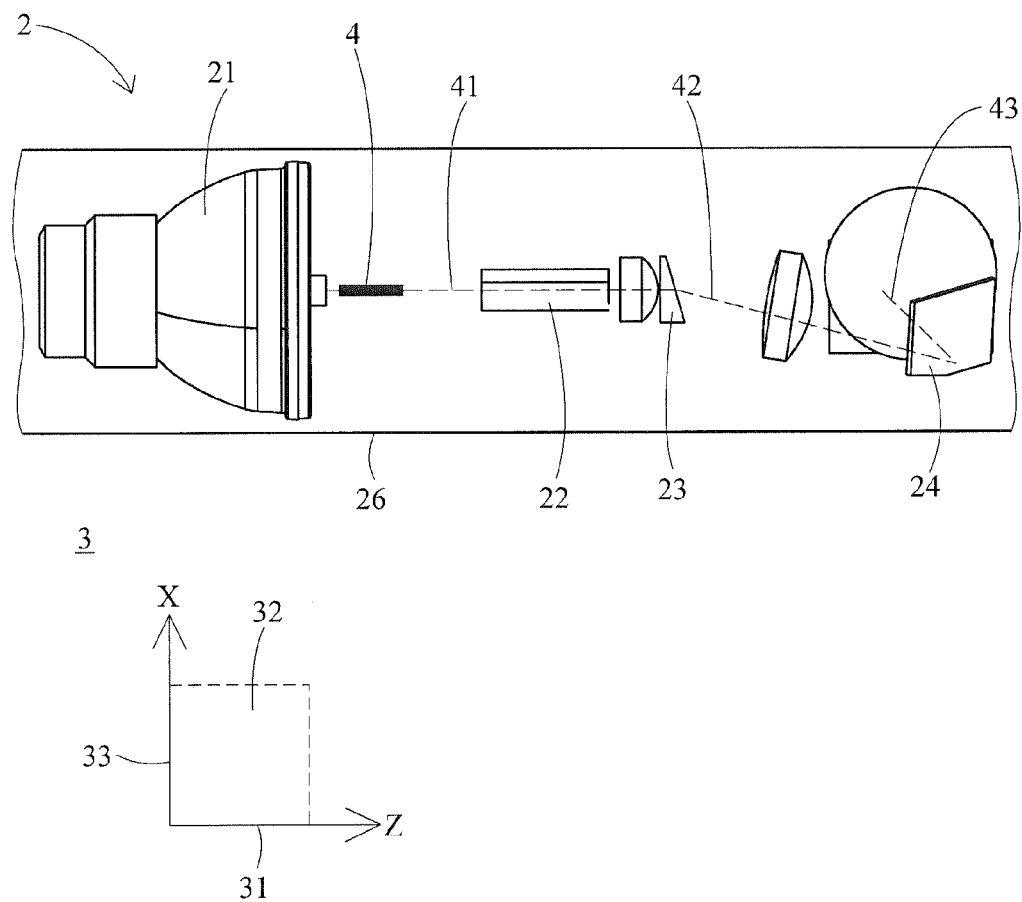
FIG. 3 is a schematic plan view of the preferred embodiment of the projecting apparatus according to the present invention.
Figure 4:
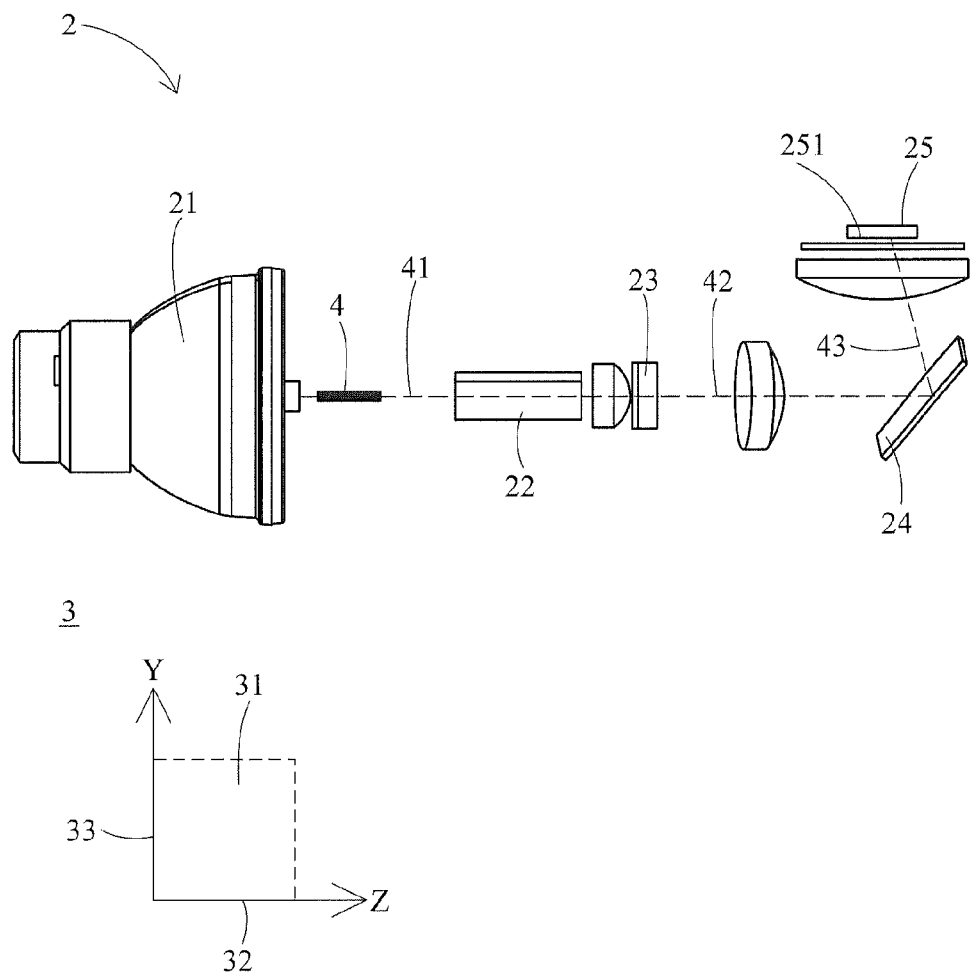
FIG. 4 is another schematic plan view of the preferred embodiment of the projecting apparatus according to the present invention (with the housing omitted from depiction)

In reference to FIGS. 2 to 4, a schematic perspective view, a schematic plan view and another schematic plan view of the preferred embodiment of a projecting apparatus 2 according to the present invention are shown therein respectively. The projecting apparatus 2 is disposed within a space 3 which is a physically three-dimensional space, so the space 3 is defined with a first imaginary plane 31, a second imaginary plane 32 and a third imaginary plane 33 which are perpendicular to one another.

The first imaginary plane 31, the second imaginary plane 32 and the third imaginary plane 33 are perpendicular to an imaginary coordinate axis X, an imaginary coordinate axis Y and an imaginary coordinate axis Z respectively. Furthermore, the first imaginary plane 31 may be parallel with a horizontal plane, so each of the second imaginary plane 32 and the third imaginary plane 33 may be parallel with a vertical plane.

The projecting apparatus 2 comprises a light source 21, a light uniformizing component 22, a prism 23, a reflecting mirror 24 and a reflective light valve 25; the aforesaid components will be illustrated in sequence hereinbelow.

The light source 21 may be a high-pressure mercury lamp or a laser generator and; in this embodiment, the light source 21 is a high-pressure mercury lamp. The light source 21 can emit a light beam 4, and the light beam 4 emitted by the light source 21 propagates along a first optical path 41 and will not change the direction (the optical path) until it impinges on the prism 23. The first optical path 41 is substantially parallel with the first imaginary plane 31 and the second imaginary plane 32; in other words, the first optical path 41 is substantially perpendicular to the third imaginary plane 33. The position of the light source 21 can affect the first optical path 41 of the light beam 4, so when the first optical path 41 is perpendicular to the third imaginary plane 33, the light source 21 is arranged horizontally and non-obliquely.

The light uniformizing component 22 is disposed in the first optical path 41 of the light beam 4, so the light beam 4 can pass through the light uniformizing component 22 when propagating along the first optical path 41. The light beam 4 is uniformized after passing through the light uniformizing component 22. The light uniformizing component 22 may be an optical component capable of uniformizing luminance of a light beam such as an integral rod or a light tunnel. Because the first optical path 41 is perpendicular to the third imaginary plane 33, the light uniformizing component 22 must be arranged horizontally and non-obliquely (i.e., the same as the light source 21) to be disposed in the first optical path 41.

It shall be appreciated that if the luminance of the light beam 4 emitted from the light source 21 is already uniform enough, then the light uniformizing component 22 may be eliminated from the projecting apparatus 2.

Figure 5:
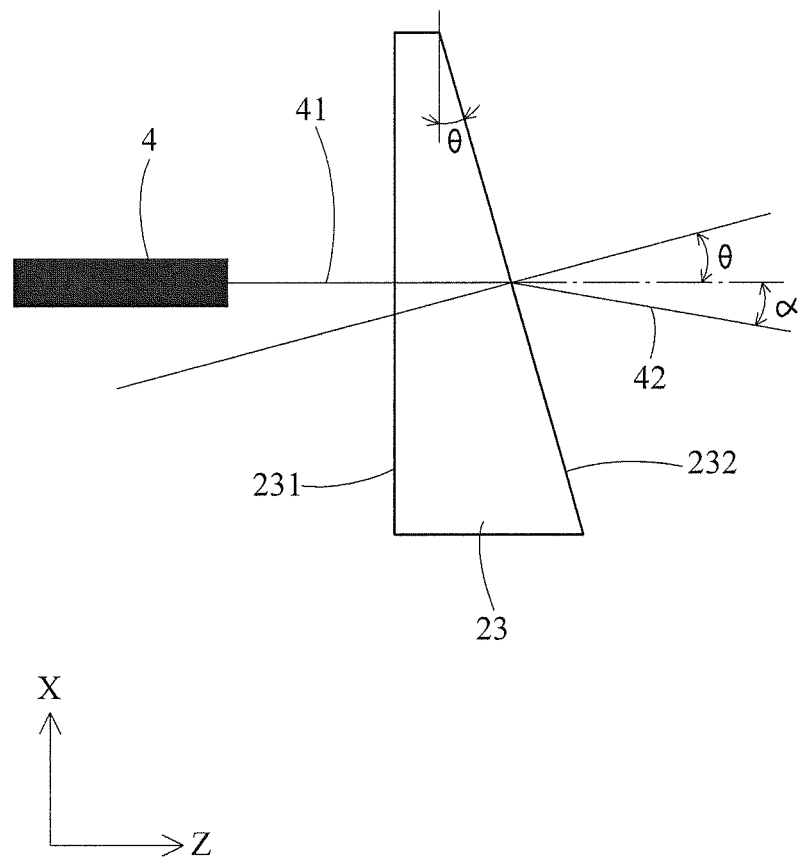
FIG. 5 is schematic view of a prism of FIG. 3.

FIG. 5 illustrates a schematic view of the prism in FIG. 3. The prism 23 is also disposed in the first optical path 41 of the light beam 4 and at the downstream of the light uniformizing component 22; in other words, the light uniformizing component 22 is located between the light source 21 and the prism 23. The prism 23 is adapted to refract the light beam 4 so that the light beam 4 propagates along a second optical path 42. The second optical path 42 intersects the first optical path 41 and defines the first included angle α therebetween, so the second optical path 42 is not perpendicular to the third imaginary plane 33.

After passing through the prism 23, the light beam 4 propagates forward obliquely at the first included angle α. The first included angle α is determined by the geometry and the refractive index of the prism 23. Specifically, the prism 23 has a light-incident flat plane 231 and a light-exiting inclined plane 232 disposed obliquely with respect to the light-incident flat plane 231, and the light beam 4 can be projected into the prism 23 through the light-incident flat plane 231 and exit out of the prism 23 through the light-exiting inclined plane 232. In detail, the light-incident flat plane 231 and the light-exiting inclined plane 232 include a second included angle θ therebetween; when the second included angle θ and the refractive index of the prism 23 are known, the first included angle α can be obtained according to the Snell's law. The Snell's law may be represented in the following formula:

$$n_1 \times \sin\theta = n_2 \times \sin(\theta+\alpha)$$

where, $n_1$ is the refractive index of the prism 23 and $n_2$ is the refractive index of the air in the space 3. In this embodiment, the second included angle θ is 10 to 20 degrees to make the value of the first included angle α appropriate so that the light beam 4 can propagate along the second optical path 42 to arrive at the reflecting mirror 24.

The reflecting mirror 24 is disposed in the second optical path 42 of the light beam 4, and can reflect the light beam 4 incident thereon into a third optical path 43. The third optical path 43 intersects the second optical path 42, so the third optical path 43 is not perpendicular to any of the imaginary planes 31, 32 and 33.

The reflective light valve 25 is disposed in the third optical path 43, and may be a device which controls the light beam 4 to be projected outside the projecting apparatus 2 through reflection such as a digital micro-mirror device (DMD) or a liquid crystal on silicon (LCOS) device; in this embodiment, the reflective light valve 25 is a DMD. The DMD 25 has an active plane 251 and the light beam 4 will be reflected by microstructures (not shown) on the active plane 251 when impinging on the active plane 251. The DMD 25 can control a portion of the light beam 4 to be reflected towards a direction and then be projected outside the projecting apparatus 2, as well as control the remaining portion of the light beam 4 to be reflected towards another direction without being projected outside the projecting apparatus 2.

The active plane 251 is substantially parallel with the second imaginary plane 32. In other words the active plane 251 is substantially perpendicular to the first imaginary plane 31 and the third imaginary plane 33. When the active plane 251 is parallel with the second imaginary plane 32, the DMD 25 as a whole is arranged horizontally and non-obliquely.

The projecting apparatus 2 may optionally further comprise a housing 26. The light source 21, the light uniformizing component 22, the prism 23, the reflecting mirror 24 and the reflective light valve 25 can all be accommodated in the housing 26 and are fixed with the housing 26. As the light source 21 and the light uniformizing component 22 are both arranged horizontally and non-obliquely, the light source 21 and the light uniformizing component 22 occupy a smaller space than that which is conventionally occupied when arranged obliquely. In this way, the housing 26 can be made to have a decreased thickness (i.e., thickness is the dimension in the imaginary axis X) but can still accommodate the light source 21, the light uniformizing component 22 and other components. Thus, the housing 26 can have a thickness smaller than 5 cm.

It shall be appreciated that the terms "substantially perpendicular (or substantially parallel)" described above shall also cover situations where the components are slightly non-perpendicular to one another (or are slightly non-parallel with one another) due to the manufacturing tolerances or errors and the assembly tolerances or errors.

According to the above descriptions, the projecting apparatus of the present have, at least, the following features:

1. Because the light source and the light uniformizing device can be arranged horizontally and non-obliquely with respect to the reflective light valve, the light source and the light uniformizing device can occupy a small space;

2. Because the light source and the light uniformizing device occupy a small space, the housing for accommodating the light source and the light uniformizing device can be made thinner;

3. The heat generated by the light source can be easily dissipated when the light source is arranged horizontally; and 4. The first included angle defined by the first optical path and the second optical path can be easily adjusted by changing the geometry of the prism.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A projecting apparatus, disposed within a space defined with a first imaginary plane, a second imaginary plane and a third imaginary plane which are perpendicular to one another, the projecting apparatus comprising:
    a light source for emitting a light beam propagating along a first optical path, wherein the first optical path is substantially parallel with the first imaginary plane and the second imaginary plane;
    a prism, disposed in the first optical path, for refracting the light beam to propagate along a second optical path, wherein the second optical path intersects the first optical path, the prism has a light-incident flat plane and a light-exiting inclined plane which is disposed obliquely with respect to the light-incident flat plane, and the light-incident flat plane is substantially perpendicular to the first optical path and parallel to the third imaginary plane, wherein the light-exiting inclined plane refracts the light beam to propagate along the second optical path;
    a reflecting mirror, disposed in the second optical path, for reflecting the light beam to propagate along a third optical path, wherein the third optical path intersects the second optical path, and the third optical path is not parallel to the first, second and third imaginary planes; and
    a reflective light valve, disposed in the third optical path and having an active plane substantially parallel with the second imaginary plane, and the active plane being arranged perpendicularly with respect to the light-incident flat plane and the light-exiting inclined plane;
    wherein the reflecting mirror is arranged obliquely with respect to the light-exiting inclined plane and the active plane.

2. The projecting apparatus as claimed in claim 1, wherein the reflective light valve is a digital micro-mirror device (DMD).

3. The projecting apparatus as claimed in claim 1, wherein the reflective light valve is a liquid crystal on silicon (LCOS) device.

4. The projecting apparatus as claimed in claim 1, wherein the light-incident flat plane and the light-exiting inclined plane define an included angle therebetween.

5. The projecting apparatus as claimed in claim 4, wherein the included angle is 10 to 20 degrees.

6. The projecting apparatus as claimed in claim 1, further comprising a light uniformizing component which is disposed in the first optical path and located between the light source and the prism.

7. The projecting apparatus as claimed in claim 1, wherein the light source is a high pressure mercury lamp.

8. The projecting apparatus as claimed in claim 1, wherein the light source is a laser generator.

9. The projecting apparatus as claimed in claim 1, further comprising a housing, wherein the light source, the prism, the reflecting mirror and the reflective light valve are accommodated in the housing.

10. The projecting apparatus as claimed in claim 9, wherein the housing has a thickness smaller than 5 centimeter.

* * * * *